United States Patent [19]
Johnson

[11] 4,167,893
[45] Sep. 18, 1979

[54] LOAD SENSING VALVE
[75] Inventor: Oliver W. Johnson, Chaska, Minn.
[73] Assignee: Eaton Corporation, Cleveland, Ohio
[21] Appl. No.: 875,714
[22] Filed: Feb. 6, 1978
[51] Int. Cl.² ............................................. F15B 13/04
[52] U.S. Cl. ........................................ 91/446; 91/467;
137/596; 60/494
[58] Field of Search ...................... 91/375 R, 412, 413,
91/446, 455, 456, 467; 137/596; 60/420, 422,
494, 384, 385

[56] References Cited
U.S. PATENT DOCUMENTS

| Re. 25,126 | 2/1962 | Charlson | 91/467 |
|---|---|---|---|
| 3,455,210 | 7/1969 | Allen | 91/446 |
| 3,815,477 | 6/1974 | Ailshie et al. | 91/411 R |
| 3,971,216 | 7/1976 | Miller | 60/445 |
| 4,043,419 | 8/1977 | Larson et al. | 60/420 X |

Primary Examiner—Edgar W. Geoghegan

Attorney, Agent, or Firm—R. J. McCloskey; J. Yakimow; L. Kasper

[57] ABSTRACT

A fluid controller is disclosed of the type including a primary valve member, and a follow-up valve member. The controller includes a load signal port and a load signal chamber. Fluid is communicated from the inlet port to the load signal chamber, and the valve members define a neutral orifice communicating between the load signal chamber and the return port when the valving is in neutral. The valving defines operating orifices communicating fluid from the load signal chamber to the main fluid path, downstream of the main flow control orifice, when the valving is shifted away from neutral. The operating orifices have a smaller orifice area when the valving approaches maximum deflection. The result is a substantially higher differential operating pressure, and a higher flow rate than would otherwise be possible at that particular valve deflection.

13 Claims, 12 Drawing Figures

LOAD SENSING VALVE

BACKGROUND OF THE DISCLOSURE

The present invention relates to load sensing fluid controllers, and more particularly, to such controllers in which the load signal level is capable of changing, depending upon the deflection of the controller valving.

It will become apparent to those skilled in the art that the present invention may be used advantageously with any type of fluid controller which is operable to control the flow of fluid from a source of pressurized fluid to a fluid operated device, wherein the source of fluid includes pressure responsive means for varying the delivery of fluid to the controller. However, the present invention is especially useful when applied to controllers such as the steering control unit of a full fluid-linked vehicle steering control system, and the invention will be described in connection therewith.

Several trends in the development of hydraulic steering control units (SCU's) are relevant to the present invention. First, as in hydraulics generally, the use of load sensing is becoming increasingly important for reasons which are now well known to those skilled in the art, such as minimizing the amount of energy consumed by the source of pressurized fluid (the pump). Second, in regard to full fluid-linked steering specifically, SCU's of the type described herein are being used on increasingly larger vehicles, thus requiring greater flow capacities.

A typical SCU, of the type to which the present invention relates, includes valving, a fluid meter, and an arrangement for imparting follow-up movement to the valving in synchronism with the flow through the fluid meter. The flow through the SCU is directly proportional to the flow area of the main flow control orifice (which is proportional to the rate at which the steering wheel is rotated), and is also proportional to the square root of the pressure drop across the main flow control orifice. As a result, increasing the flow capacity of an SCU has necessitated increasing the flow area of the various valving passages and orifices and, as the result, increasing the overall size of the SCU.

Attempts have also been made to increase the flow capacity of the SCU by increasing the pressure drop across the main flow control orifice. This provides a satisfactory flow rate at the higher valve deflections, but results in an excessive flow and gain rate through the valving for lower valve deflections. Increasing the pressure drop across the main flow control orifice also increases the standby pressure delivered to the SCU, increasing the potential for leakage through a closed center SCU (causing vehicle "drift"), and wasting pump energy.

It is known in the load sensing directional spool valve art to overcome the latter problem by communicating the load signal with tank when the valve is in neutral and bleeding signal fluid through a synthetic signal generator and into the main flow path, downstream of the main flow control orifice, when the valve is shifted from neutral. See U.S. Pat. Nos. 3,815,477 and 3,971,216. Thus, the prior art provides a relatively lower load signal when the valve is in neutral, and a relatively higher load signal when the valve is away from neutral, anywhere in its operating range.

SUMMARY OF THE INVENTION

Accordingly, it is an object of the present invention to provide a fluid controller of the type described hereinafter which provides a substantially greater differential operating pressure at higher valve deflections, without an undesirable increase in the stand-by pressure when the valve is in neutral, or an undesirable increase in the differential operating pressure at the lower valve deflection.

The above, and other objects of the present invention, are accomplished by the provision of a controller of the type described herein. The controller comprises housing means including inlet and return ports, first and second control fluid ports, and a load signal port. Valve means is disposed in the housing and has a neutral position, a normal operating position, and a fully actuated position. The valve means and the housing cooperate to define a load signal chamber in fluid communication with the load signal port. The controller includes means for imparting follow-up movement to the valve means in response to the flow of fluid to or from the associated fluid operated device. The housing means and valve means cooperate to define a first fluid path communicating between the inlet port and the first control fluid port and between the second control fluid port and the return port when a valve means is displaced from the neutral position. The first fluid path includes a variable flow control orifice having a zero flow area when the valve means is in neutral, an increasing flow area as the valve means is displaced from neutral, and a maximum flow area when the valve means is in the fully actuated position. Load signal fluid is communicated from the inlet port or the first fluid path, upstream of the variable flow control orifice, to the load signal chamber. The valve means defines an operating fluid orifice means communicating load signal fluid from the load signal chamber to the first fluid path downstream of the variable flow control orifice. The operating fluid orifice means has one flow area when the valve means is in the normal operating position and another flow area when the valve means is in the fully actuated position. As a result, the fluid pressure in the load signal chamber is at one pressure level when a valve means is in the normal operating position and another pressure level when the valve means is in the fully actuated position, corresponding to the maximum rate of rotation of the steering wheel.

Typically, the flow area of the operating fluid orifice means is greater when the valve means is in the normal operating position, so that the load signal pressure is lower than when the valve means is in the fully actuated position.

DESCRIPTION OF THE PREFERRED EMBODIMENT

Figure 1:
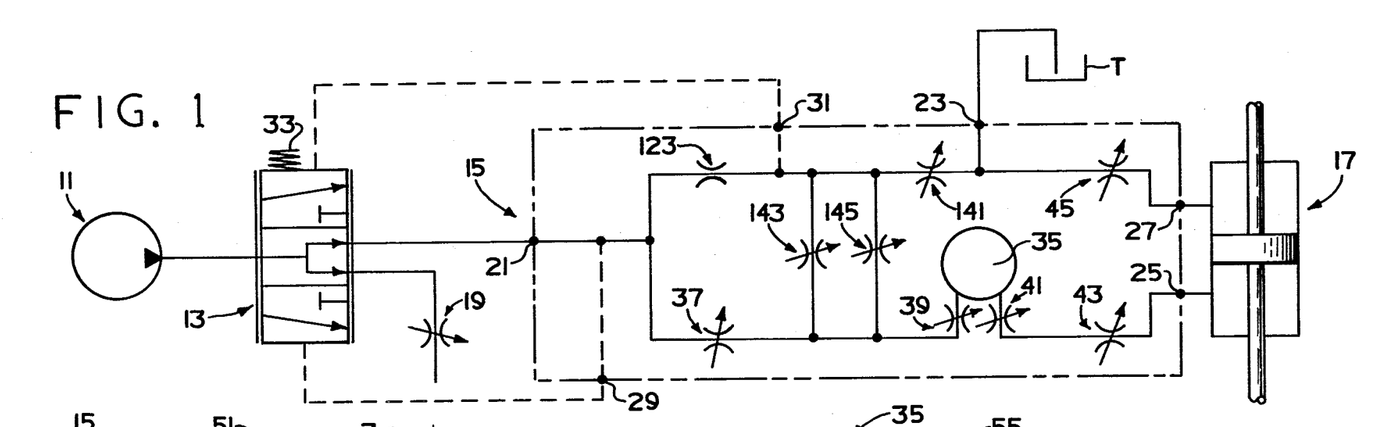
FIG. 1 is a schematic of an hydraulic system including a controller made in accordance with the present invention.

Referring now to the drawings, which are not intended to limit the invention, FIG. 1 is a schematic of an hydraulic system including a fluid controller made in accordance with the teachings of the present invention. The system includes a fluid pump 11 and a pilot operated, priority flow control valve 13. The control valve 13 apportions the flow of fluid from the pump 11 between a primary circuit including a fluid controller 15 and a fluid operated motor 17, and an auxiliary circuit represented herein as a variable orifice 19. Preferably, because the pump 11 is shown herein as a fixed displacement pump, the auxiliary circuit should be of the open center type.

Controller

The fluid controller 15 includes an inlet port 21, a return (tank) port 23 and a pair of control (cylinder) ports 25 and 27 which are connected to the opposite ends of the fluid motor (cylinder) 17. The controller 15 further includes a pressure port 29 and a load signal port 31 as will be described in greater detail subsequently.

The priority flow control valve 13 may be of the type illustrated in U.S. Pat. No. 3,455,210, assigned to the assignee of the present invention, and incorporated herein by reference. The control valve 13 is biased by a pressure signal from pressure port 29 toward a position permitting substantially all fluid to flow to the auxiliary circuit. At the same time, the control valve 13 is biased by a compression spring 33 and a pressure signal from the load signal port 31 toward a position permitting substantially all fluid to flow to the primary circuit.

The fluid controller 15 (shown in greater detail in FIGS. 2 and 3) may be of the type illustrated and described in U.S. Pat. No. Re. 25,126, assigned to the assignee of the present invention and incorporated herein by reference. During a steering operation, the fluid controller defines a fluid flow path communicating between the inlet port 21 and a fluid meter 35. This fluid path includes a main flow control orifice 37 and a second variable orifice 39. Fluid exhausted from the fluid meter 35 passes through a third variable orifice 41, and a fourth variable orifice 43 to the control port 25. Fluid displaced by the motor 17 and returning through the control port 27 flows through a fifth variable orifice 45 to the tank port 23, and then to a fluid reservoir or tank T.

Figure 2:
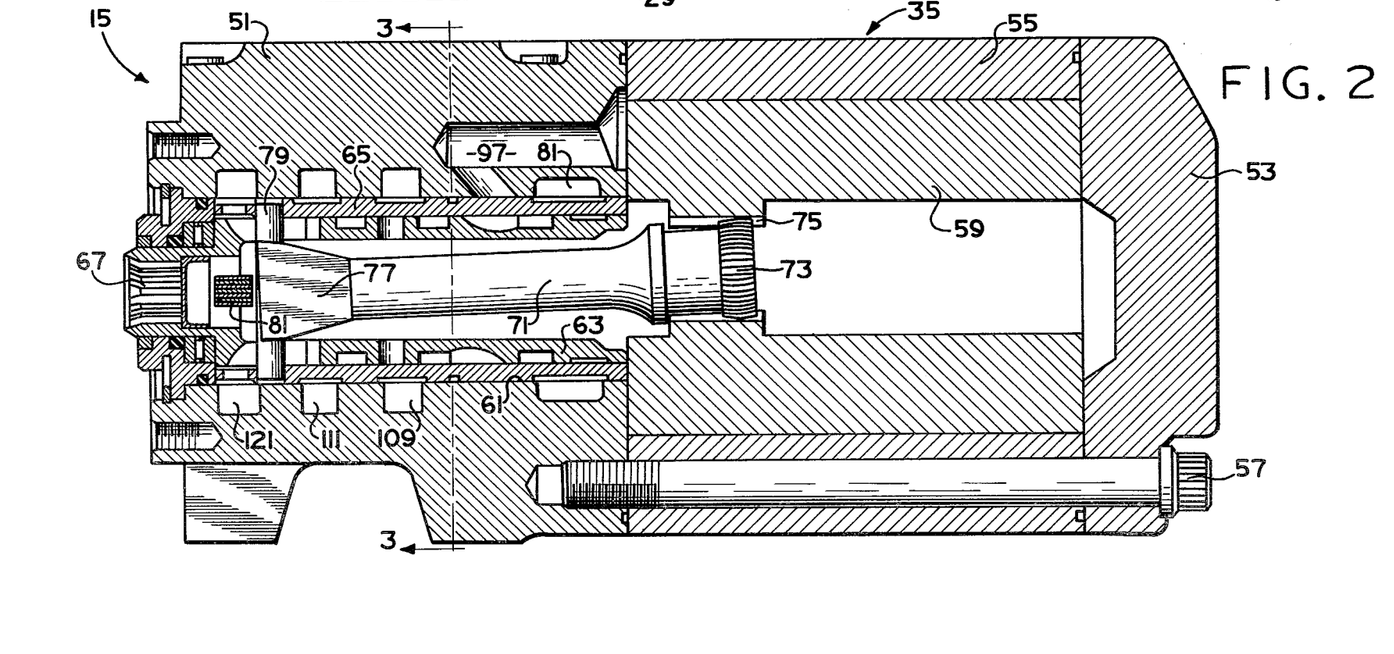
FIG. 2 is an axial cross section of a controller of the type to which the present invention relates.
Figure 3:
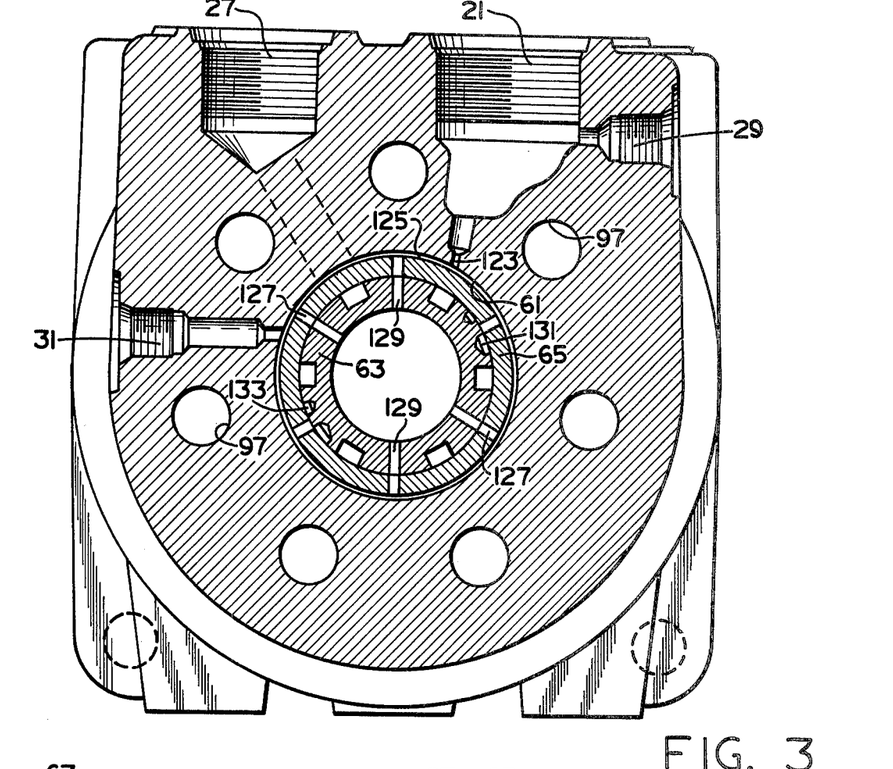
FIG. 3 is a transverse cross section taken on line 3—3 of FIG. 2, but on a larger scale.

Referring now to FIGS. 2 and 3, the fluid controller 15 will be described only briefly in view of the incorporation herein of the previously referenced U.S. Pat. No. Re. 25,126. The controller 15 includes a valve housing 51, the fluid meter 35 and an end cap 53. In the subject embodiment, the fluid meter 35 comprises a gerotor gear set including an internally toothed member 55 held in fixed relation to the housing 51 and end cap 53 by a plurality of bolts 57, and an externally toothed member 59, eccentrically disposed within member 55 for relative orbital and rotational movement. As is well known in the art, the toothed interengagement of the members 55 and 59 defines a plurality of expanding and contracting volume chambers (not shown in the drawing figures).

The valve housing 51 defines a valve bore 61 within which is rotatably disposed the controller valving, including a primary valve member (spool) 63, and a cooperating, relatively rotatable follow-up valve member (sleeve) 65. Spool 63 terminates at its forward end in an internal splined portion 67 for connection to an externally splined shaft (not shown), such as may be attached to a steering wheel.

The sleeve 65 is coupled to the spool 63 by means of a drive shaft 71 having, at its rearward end, a set of crowned external splines 73 in engagement with a set of straight, internal splines 75 formed within the externally toothed member 59. At the opposite end of the drive shaft 71 is a bifurcated end portion 77 through which passes a transverse drive pin 79. The transverse drive pin 79 passes through an opening in the spool 63 and engages the sleeve 65 in a manner well known in the art, and which forms no part of the present invention. Disposed approximately at right angles to the drive pin 79 is a plurality of leaf springs 81 urging spool 63 and sleeve 65 toward the neutral position relative to each other.

Figure 4:
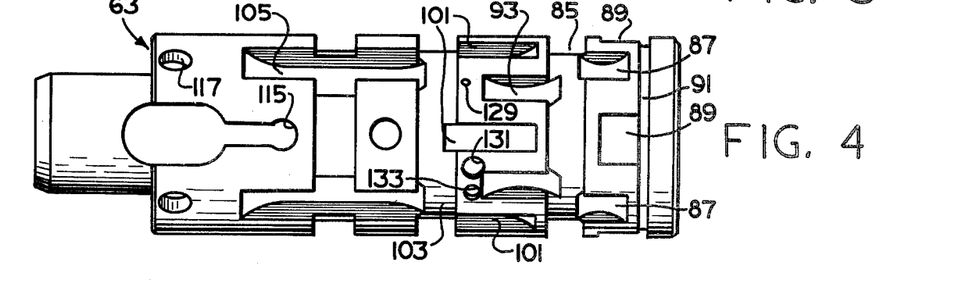
FIG. 4 is a plan view of the primary valve member (spool), on the same scale as FIG. 3.
Figure 5:
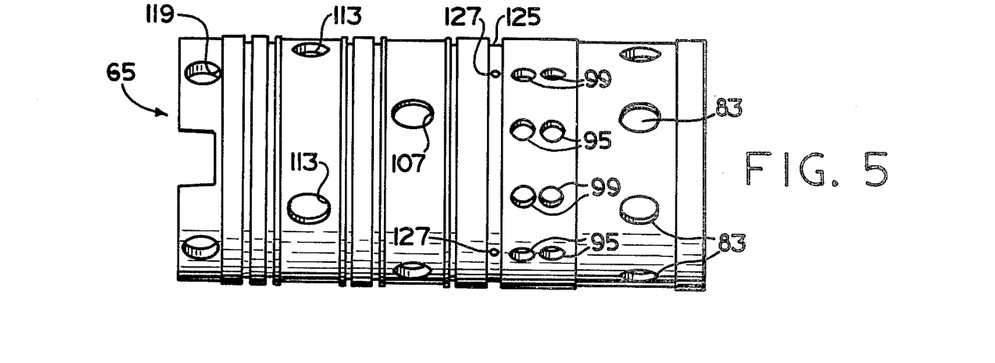
FIG. 5 is a plan view of the follow-up valve member (sleeve), on the same scale as FIG. 3.

Referring now primarily to FIGS. 4 and 5, the controller valving, as well as its operation and the flow paths therethrough, will be described in some detail. Pressurized fluid entering the inlet port 21 is communicated to an annular groove 81 (see FIG. 2) defined by the valve housing 51. Pressurized fluid in the annular groove 81 is in continuous fluid communication with each of a plurality of fluid ports 83 defined by the sleeve 65. The spool 63 defines an annular groove 85, and extending to the right from the groove 85, and in communication therewith, is a plurality of axial slots 87. Circumferentially disposed between each adjacent pair of axial slots 87 is an axial slot 89, each of the axial slots 89 communicating with a pressure balancing groove 91, which forms no part of the present invention.

With the spool 63 and the sleeve 65 in the neutral position relative to each other, flow through the ports 83 is blocked by the outer surface of the spool 63, thus making the valving closed center. When steering is initiated (assume clockwise rotation of spool 63, as viewed from the left in FIG. 4, relative to the sleeve 65), each of the axial slots 87 begins to communicate with one of the ports 83. The composite of all of the individual variable orifices formed between the axial slots 87 and the ports 83 comprises the main flow control orifice 37, shown schematically in FIG. 1.

The inlet fluid in the axial slots 87 flows through the annular groove 85 and into a plurality of axial slots 93, each of which cooperates with a pair of meter ports 95 defined by the sleeve 65 to define a pair of variable orifices, the composite of all such orifices defined by the slots 93 and ports 95 comprising the second variable orifice 39 of FIG. 1. Inlet fluid in the meter ports 95 is communicated to the expanding volume chambers of the fluid meter 35 of FIG. 1 through a plurality of commutating passages 97 (FIGS. 2 and 3) as is well known in the art. Metered fluid returning from the contracting volume chambers of fluid meter 35 flows through alternating ones of the commutating passages 97 to alternating sets of meter ports 99, each pair of which communicates with an axial slot 101 in the spool 63 to define a pair of individual variable orifices, the composite of which comprise the third variable orifice 41 of FIG. 1.

Metered fluid from each of the axial slots 101 enters an annular groove 103, from which the fluid flows into a plurality of axial slots 105. Each of the slots 105 cooperates with an adjacent fluid port 107 defined by the sleeve 65 to define a variable orifice, the composite of which comprises the fourth variable orifice 43 of FIG. 1. Fluid flowing from each of the ports 107 enters an annular groove 109 (see FIG. 2) defined by the housing 51, the annular groove 109 being in continuous fluid communication with the cylinder port 25. In continuous fluid communication with the cylinder port 27, and receiving fluid returning from the motor 17 is an annular groove 111 (see FIG. 2) defined by the housing 51. Returning fluid in groove 111 flows through a plurality of fluid ports 113, each of which cooperates with an opening 115 in the spool 63 to define a variable orifice, the composite of such orifices comprising the fifth variable orifice 45 of FIG. 1. Return fluid entering the opening 115 flows to the interior of the spool 63, then out through a plurality of ports 117 in the spool 63, through a plurality of ports 119 in the sleeve 65 and into an annular groove 121 (FIG. 2), defined by the housing 51. The annular groove 121 is in continuous fluid communication with the return port 23.

Load Sensing Circuit

As may be seen schematically in FIG. 1, the controller 15 provides another flow path for pressurized fluid entering the inlet port 21, in parallel with the main flow path (just described) through the main flow control orifice 37. This alternate path includes a fixed bleed orifice 123 (FIGS. 1 and 3), through which a small volume of fluid flows into an annular load sensing groove 125 (FIGS. 3, 5, 6, and 7) formed on the exterior of the sleeve 65. It should be apparent to those skilled in the art that the supply of load signal fluid may be fed to the load sensing groove 125 from a source different than that shown in FIGS. 1 and 3. However, the arrangement shown will generally be the simplest and will provide load signal fluid at a closely controlled pressure level. The load sensing groove 125 is in continuous fluid communication with the load signal port 31, such that the fluid pressure in the groove 125 will be substantially the pressure of the signal transmitted from the port 31 to the appropriate pressure responsive mechanism, in the subject embodiment, the flow control valve 13.

The load sensing groove 125 is in continuous fluid communication with a plurality of radial bores 127 formed in the sleeve 65 (see FIGS. 5, 6, and 7), in the subject embodiment, there being six of the radial bores 127. The spool 63 defines a plurality of radial bores 129 (FIGS. 4, 6, and 8), in the subject embodiment, there being four of the radial bores 129. As may best be seen in FIGS. 4 and 7, at the end of one of the axial slots 93 there is disposed a relatively larger counterbore 131, and a relatively smaller counterbore 133, each of the counterbores 131 and 133 being in open fluid communication with the axial slot 93. In the subject embodiment, as may best be seen in FIG. 6, there are two pairs of counterbores 131 and 133 diametrically opposed, each pair being in communication with an axial slot 93 as described previously. It should be noted in FIG. 6 that the counterbores 131 and 133 are arranged such that for either direction of relative displacement of the spool 63 and sleeve 65, one of the adjacent radial bores 127 will communicate with a larger counterbore 131 and the other of the adjacent radial bores 127 will communicate with a smaller counterbore 133 for reasons which will become apparent subsequently.

Referring now primarily to FIGS. 8 through 11, in conjunction with the schematic of FIG. 1, it may be seen that each of the radial bores 129 cooperates with an adjacent one of the radial bores 127 to define a variable orifice, the composite of which comprises a variable neutral orifice 141 of FIG. 1. When the variable orifice 141 is open, pressurized fluid in the load sensing groove 125 flows through the variable orifices defined by the radial bores 127 and 129 into the interior of the spool 63, then to the return port 23 in the manner previously described. It should be noted that when the spool 63 and sleeve 65 are in the neutral position shown in FIGS. 6 and 8, the variable orifice 141 has its maximum orifice area, and as the spool and sleeve are relatively displaced from the neutral position, the area of the orifice 141 is gradually reduced (see graph of FIG. 12).

Figure 8:
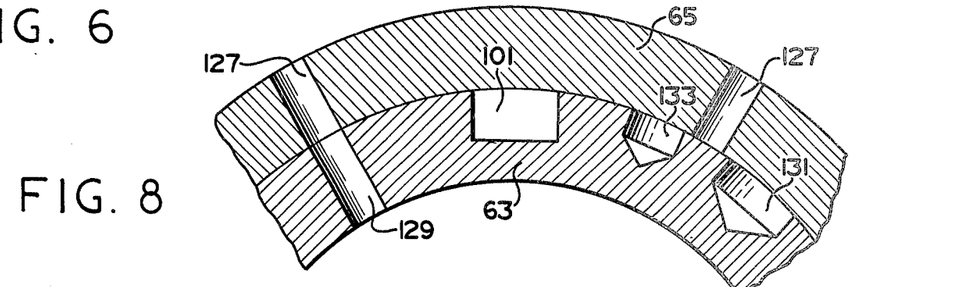
FIG. 8 is an enlarged, fragmentary, transverse cross section of the valving, similar to FIG. 6, in the neutral position.

As may best be seen in FIG. 8, when the spool and sleeve are in the neutral position, the two radial bores 127 not in communication with one of the radial bores 129 are each disposed between a counterbore 131 and a counterbore 133, such that fluid flow through these two radial bores 127 is blocked by the external surface of the spool 63. As the spool and sleeve are relatively displaced from the neutral position (assume clockwise rotation of the spool 63 in FIG. 8), the radial bore 127 cooperates with the counterbore 133 after several degrees of relative rotation, to define a variable orifice, designated 143 in FIG. 1. At the same time, the diametrically opposite radial bore 127 begins to cooperate with the larger counterbore 131 to define a variable orifice, designated 145 in FIG. 1.

Figure 12:
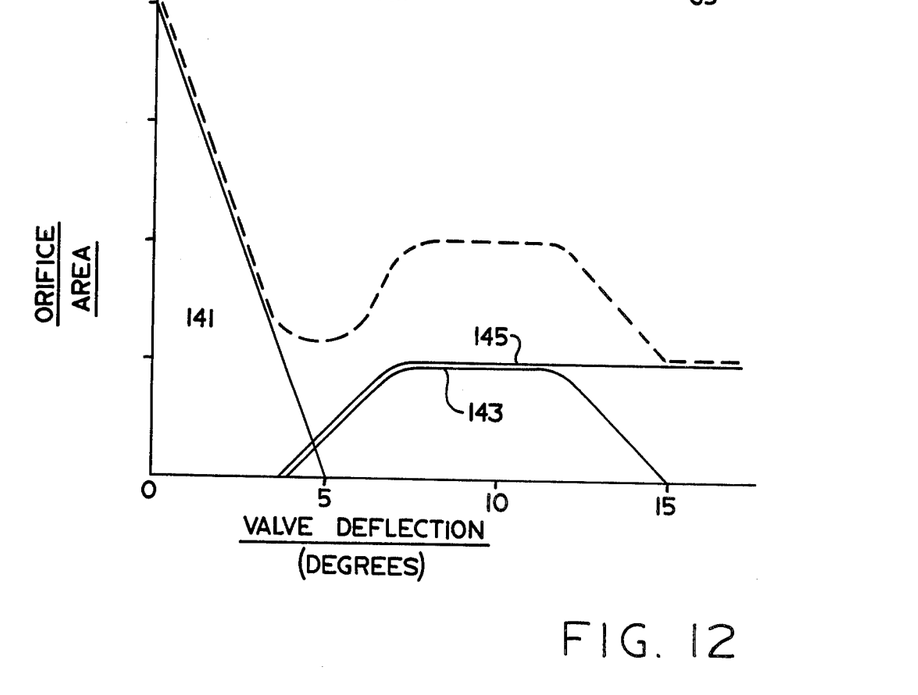
FIG. 12 is a graph of orifice area versus valve deflection for the variable orifices communicating with the load signal chamber.

By reference to FIG. 12, it may be seen that while the variable neutral orifice 141 has an orifice area which decreases rapidly as the valving moves from a deflection of zero degrees (neutral) to five degrees, the variable orifices 143 and 145 both begin to open at about four degrees of valve deflection, and before the neutral orifice 141 closes. Therefore, for valve deflections in the range of zero to four degrees, substantially all of the fluid passing through the fixed bleed orifice 123 flows through the variable neutral orifice 141 to tank. For valve deflections in the range of four degrees to five degrees, a portion of the fluid passing through the bleed orifice 123 flows through the neutral orifice 141, while the remainder flows through the variable orifices 143 and 145, recombining with the main flow path. For valve deflections above five degrees, substantially all of the fluid passing through the bleed orifice 123 flows through the variable orifices 143 and 145 to the main flow path.

Figure 6:
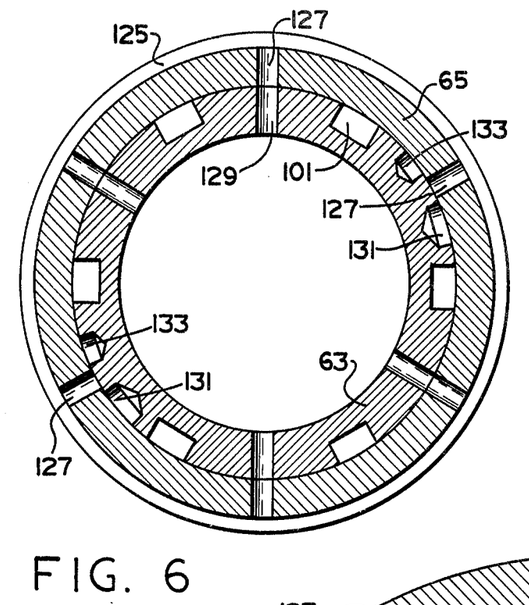
FIG. 6 is an enlarged, transverse cross section of the valving, similar to FIG. 3.
Figure 7:
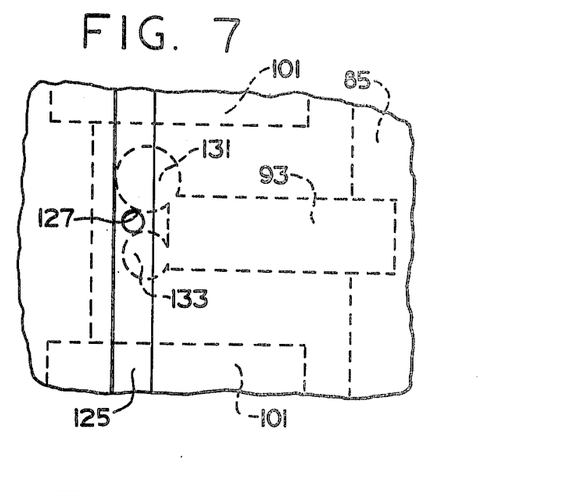
FIG. 7 is a fragmentary, lay out view illustrating one aspect of the valving.

In order to achieve a stand-by pressure in neutral which is lower than the differential operating pressure during normal valve actuation, it is necessary to have the fluid pressure in the load signal chamber (groove 125) at a lower "level" in neutral. This may be accomplished by making the maximum flow area of the neutral orifice 141 greater than the total maximum flow area of variable orifices 143 and 145. Referring to FIG. 6, it will be appreciated that, in the subject embodiment, the flow areas of the orifices 141, 143, and 145 are determined by the size of the radial bores 127, all of which are the same. Therefore, the flow area of neutral orifice 141 is four times the area of a bore 127, while the flow area of each of the orifices 143 and 145 is equal to one of the bores 127, resulting in a flow area ratio (neutral-:operating) of 2:1.

Figure 9:
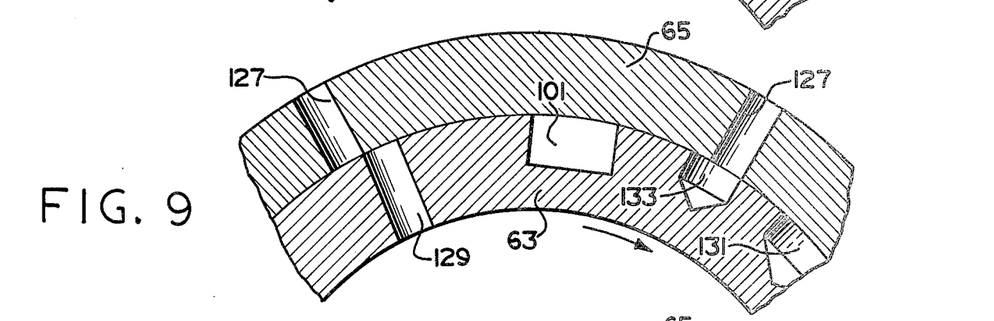
FIG. 9 is a fragmentary view similar to FIG. 8 illustrating the valving in a normal steering position.
Figure 10:
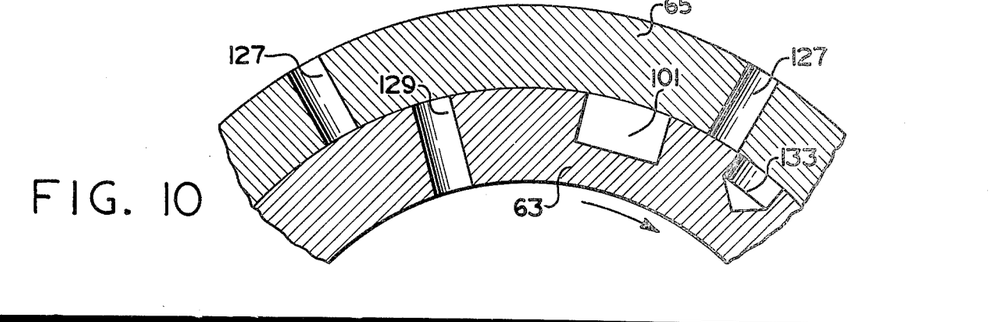
FIG. 10 is a fragmentary view, similar to FIGS. 8 and 9 illustrating the valving at maximum deflection.
Figure 11:
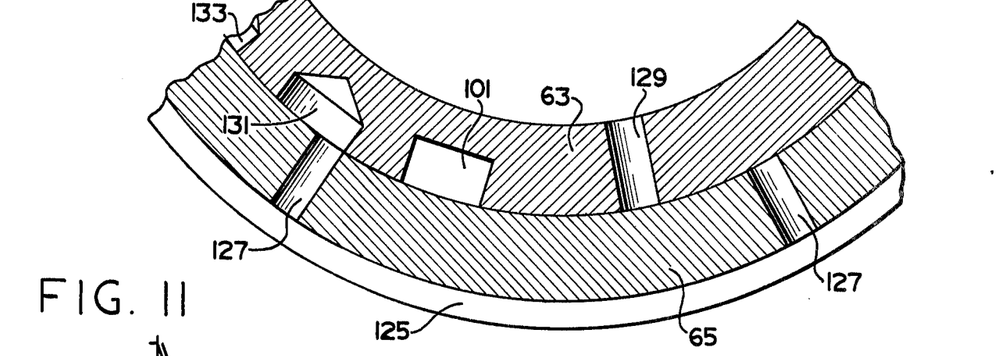
FIG. 11 is a fragmentary, transverse cross section of another portion of the valving, corresponding to the maximum deflection position of FIG. 10.

Referring now primarily to FIGS. 9 and 12, it may be seen that the flow area of the variable orifices 143 and 145 continues to increase from the point at which they first began to open at about four degrees of valve deflection until about seven degrees of valve deflection, at which point the flow area of the orifices 143 and 145 has reached its maximum and levels off as shown in FIG. 12. This condition is illustrated in FIG. 9, in which the radial bore 127 is in complete communication with the counterbore 133. Similarly, the diametrically opposed radial bore 127 is also in complete communication with the adjacent, larger counterbore 131.

As the valve deflection further increases, the flow area of the variable orifices 143 and 145 remains at its maximum, until a valve deflection of about 12 degrees is reached. At this point, with the spool 63 moved somewhat clockwise from the position shown in FIG. 9, the communication between the radial bore 127 and the counterbore 133 is no longer complete, and the flow area of orifice 143 begins to decrease. At the same time, however, the communication between the diametrically opposed radial bore 127 and the larger counterbore 131 is still complete, and the flow area of orifice 145 remains at the maximum. As valve deflection further increases the spool 63 and sleeve 65 will attain the relative positions shown in FIG. 10 when the valve deflection reaches about 15 degrees. At this point, the radial bore 127 and counterbore 133 are completely out of communication and the orifice area of variable orifice 143 has become zero. However, the opposite radial bore 127 is still in complete communication with the counterbore 131, and the orifice area of variable orifice 145 remains at its maximum.

Referring still to FIG. 12, it may be seen that in addition to the graphs of the orifice areas for variable orifices 141, 143, and 145, there is shown a graph (dashed line) representing the cumulative orifice area. Because high pressure fluid is constantly being bled into the load sensing circuit (groove 125) through the fixed bleed orifice 123, it should be apparent that the fluid pressure in the load sensing circuit and at the load signal port 31 is directly related to the area of orifices permitting fluid to escape from the load sensing circuit, either to tank or to the main flow path. Therefore, the inverse of the cumulative area graph of FIG. 12 represents the variations in the load signal level over the range of valve deflection. It will be understood by those skilled in the art that the term "load signal level" does not refer to the actual pressure signal present at load signal port 31, but rather, to the difference between the actual steering load and the load signal pressure. This difference is typically referred to as the differential operating pressure, except in the special situation when the valving is in its neutral position, in which case the differential is referred to as the stand-by pressure, because there is no operating load. Thus, the stand-by pressure denotes the difference between tank pressure (assumed to be zero psi) and the output pressure of the variable fluid source, such as a variable displacement pump or load sensing priority valve as shown in FIG. 1.

Referring again to FIG. 12, it may be seen that for a valve deflection of zero degrees, the stand-by pressure is at its minimum. As valve deflection increases, the differential operating pressure rises rapidly until, at a valve deflection of about three to four degrees, the differential pressure is at a typical operating level, for example 100 psi. Depending upon the relative timing of the decrease of variable orifice 141 and the increase of variable orifices 143 and 145, the differential pressure may level off at the operating level for valve deflections above three to four degrees or, as in the subject embodiment, there may be a sufficient decrease in cumulative orifice area at about four or five degrees of valve deflection to cause the load signal pressure to slightly "overshoot" the operating level. In the embodiment represented by the graph of FIG. 12, the differential pressure temporarily rises to about 125 psi for valve deflections in the range of four to five degrees.

The differential pressure in FIG. 12 is shown as being constant for valve deflections in the range of about six degrees to about 12 degrees, which covers most of the normal steering activity, so that throughout this range, flow rate will be directly proportional to valve deflection.

As the valve deflection increases from 12 degrees to 15 degrees, the cumulative orifice area decreases until it reaches the minimum, and thereafter, as valve deflection further increases toward the maximum (in the subject embodiment, about 18 degrees), the orifice area remains substantially constant. The result is that for valve deflections above 12 degrees, the differential pressure begins to rise until it reaches a maximum level for valve deflections of 15 degrees and greater. As is well known to those skilled in the art, fluid flow through a sharp edge orifice is directly proportional to the square root of the pressure drop across the orifice. In addition, the rate of fluid flow through the main flow path of FIG. 1 is directly proportional to the area of the main flow control orifice 37, and therefore, is related to the number of degrees of valve deflection. By way of example, with a typical prior art controller of the type illustrated in FIG. 2, an increase in valve deflection to increase the area of the main flow control orifice 37 by a factor of two, would also increase the flow rate by a factor of two. For example, if the flow rate at one-half the maximum orifice area were 10 gpm, the flow rate at maximum orifice area (and maximum valve deflection) would be 20 gpm. However, with the present invention providing a larger differential pressure for larger valve deflections (e.g., 200 psi), the flow rate at maximum deflection would be 28 gpm, rather than 20.

It may be seen that the present invention makes it possible to "custom design" the relationship between the differential operating pressure and the valve deflection by modifying the sizes and rates of change of size of the various variable orifices communicating between the load signal chamber and the return port or the main flow path. In the subject embodiment, the present invention makes it possible to substantially increase the maximum flow rate through the controller, without increasing the size of the orifices comprising the main flow path, which would necessitate increasing the physical size of the controller. The invention also makes it possible to substantially increase the maximum flow rate through the controller without the need for a corresponding large differential pressure at lower valve deflections, which would result in greater power loss in neutral.

What is claimed is:

1. A controller operable to control the flow of fluid from a source of pressurized fluid to a fluid pressure operated device, the source of fluid including pressure responsive means for varying the delivery of fluid to said controller, said controller comprising:
    (a) housing means including an inlet port for connection to the source of fluid, a return port for connection to a reservoir, first and second control fluid ports for connection to the fluid pressure operated device, and a load signal port for connection to the pressure responsive means;
    (b) valve means disposed in said housing means and defining a neutral position, a normal operating position, and a fully actuated position;
    (c) said valve means and said housing means cooperating to define a load signal chamber in continuous fluid communication with said load signal port;
    (d) means for imparting follow-up movement to said valve means in response to the flow of fluid to or from the fluid pressure operated device;
    (e) said housing means and said valve means cooperating to define a first fluid path communicating between said inlet port and said first control fluid port and between said second control fluid port and said return port when said valve means is disposed from said neutral position in a first direction;
    (f) said first fluid path including a first variable flow control orifice having substantially a zero flow area when said valve means is in said neutral position, an increasing flow area as said valve means is displaced from said neutral position, and a maximum flow area when said valve means is in said fully actuated position;
    (g) means operable to communicate load signal fluid from one of said inlet port and said first fluid path, upstream of said first variable flow control orifice, to said load signal chamber;
    (h) one of (1) said valve means and (2) said valve means and said housing means defining first operating fluid orifice means communicating load signal fluid from said load signal chamber to said first fluid path downstream of said first variable flow control orifice, said first operating fluid orifice means having one flow area when said valve means is in said normal operating position and another flow area when said valve means is in said fully actuated position to provide a fluid pressure in said load signal chamber at one pressure level when said valve means is in said normal operating position and at another pressure level when said valve means is in said fully actuated position.

2. A controller as claimed in claim 1 wherein said one flow area is greater than said another flow area, whereby the fluid pressure in said load signal chamber is lower when said valve means is in said normal operating position than when said valve means is in said fully actuated position.

3. A controller as claimed in claim 1 wherein said housing means and said valve means cooperate to define a second fluid path communicating between said inlet port and said second control fluid port and between said first control fluid port and is said second return port when said valve means is displaced from said neutral position in a second direction.

4. A controller as claimed in claim 3 wherein said second fluid path includes a second variable flow control orifice having substantially a zero flow area when said valve means is in said neutral position, an increasing flow area as said valve means is displaced from said neutral position in said second direction, and a maximum flow area when said valve means is in said fully actuated position.

5. A controller as claimed in claim 4 including means to communicate load signal fluid from one of said inlet port and said second fluid path, upstream of said second variable flow control orifice, to said load signal chamber.

6. A controller as claimed in claim 5 wherein one of said valve means and said valve means and said housing means define second operating fluid orifice means communicating load signal fluid from said load signal chamber to said second fluid path downstream of said second variable flow control orifice, said second operating fluid orifice means having said one flow area when said valve means is in said normal operating position and said another flow area when said valve means is in said fully actuated position.

7. A controller as claimed in claim 1 wherein said first operating fluid orifice means comprises one orifice and another orifice, both of said orifices being open when said valve means is in said normal operating position; and said one orifice being closed and said another orifice being open when said valve means are in said fully actuated position.

8. A controller as claimed in claim 1 wherein said first operating fluid orifice means has a zero flow area when said valve means is in said neutral position.

9. A controller as claimed in claim 8 wherein said valve means provides a neutral fluid-orifice communicating fluid from said load signal chamber to said return port when said valve means is in said neutral position.

10. A controller as claimed in claim 9 wherein the flow area of said neutral fluid orifice is greater than the flow area of said first operating fluid orifice means to provide a fluid pressure in said load signal chamber which is at a lower level when said valve means is in said neutral position than when said valve means is in said normal operating position.

11. A controller as claimed in claim 9 wherein the flow area of said neutral fluid orifice gradually decreases to zero as the valve means is displaced from said neutral position to said normal operating position.

12. A controller as claimed in claim 11 wherein the flow area of said first operating fluid orifice means begins to gradually increase from zero before the flow area of said neutral fluid orifice reaches zero, as said valve means is displaced from said neutral position to said normal operating position.

13. A controller operable to control the flow of fluid from a source of pressurized fluid to fluid pressure operated device, the source of fluid including pressure responsive means for varying the delivery of fluid to said controller, said controller comprising:
    (a) housing means including an inlet port for connection to the source of fluid, a return port for connection to a reservoir, first and second control fluid ports for connection to the fluid pressure operated device, and a load signal port for connection to the pressure responsive means;
    (b) valve means disposed in said housing means including a primary, rotatable valve member and a cooperating, relatively rotatable follow-up valve member, said valve members defining a neutral position relative to each other and a fully actuated position relative to each other;

(c) means for imparting follow-up movement to said follow-up valve member in response to the flow of fluid to or from the fluid pressure operated device;

(d) said primary and follow-up valve members cooperating with said housing to define a first fluid path communicating said inlet port to said first control port and said second control port to said return port when said valve members are relatively displaced in a first direction from the neutral position, and a second fluid path communicating said inlet port to said second control port and said first control port to said return port when said valve members are relatively displaced in a second direction from the neutral position;

(e) said housing means and the adjacent one of said primary and follow-up valve members cooperating to define a load signal chamber in continuous fluid communication with said load signal port;

(f) said first fluid path including a first variable flow control orifice and said second fluid path including a second variable flow control orifice, said first and second flow control orifices each having a zero flow area when said valve members are in and adjacent the neutral position and a gradually increasing flow area as said valve members are relatively displaced further from the neutral position;

(g) means operable to communicate load signal fluid from one of said inlet port, said first fluid path upstream of said first flow control orifice and said second fluid path upstream of said second flow control orifice to said load signal chamber;

(h) said primary and follow-up valve members cooperating to define a neutral fluid orifice communicating fluid from said load signal chamber to said return port when said valve members are in the neutral position, and first and second operating fluid orifices communicating fluid from said load signal chamber to said first and second fluid paths, respectively, downstream of said first and second flow control orifices, respectively, whereby the fluid pressure in said load signal chamber and at said load signal port is at one level when said valve members are in the neutral position and at another level when said valve members are relatively displaced from the neutral position.

* * * * *